(12) United States Patent
Beausseroy et al.

(10) Patent No.: US 6,668,651 B2
(45) Date of Patent: Dec. 30, 2003

(54) METHOD FOR CONTACTLESS MEASURING OF VIBRATIONS OF A ROTATING BODY

(75) Inventors: Pierre Jean Emile Beausseroy, Troyes (FR); Jean-louis Eyraud, Maincy (FR); Régis Léo Marie Jean Lengelle, Torvilliers (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 09/926,752

(22) PCT Filed: Apr. 12, 2001

(86) PCT No.: PCT/FR01/01128

§ 371 (c)(1),
(2), (4) Date: Dec. 12, 2001

(87) PCT Pub. No.: WO01/79793

PCT Pub. Date: Oct. 25, 2001

(65) Prior Publication Data

US 2002/0134158 A1 Sep. 26, 2002

(30) Foreign Application Priority Data

Apr. 13, 2000 (FR) .............................................. 00 04768

(51) Int. Cl.[7] .............................................. G01N 29/06
(52) U.S. Cl. .............................. 73/579; 73/593; 73/660; 73/659
(58) Field of Search .......................... 73/579, 659, 660, 73/662, 593, 584

(56) References Cited

U.S. PATENT DOCUMENTS

| 3,654,803 | A | * | 4/1972 | Robinson | 73/660 |
|---|---|---|---|---|---|
| 3,929,008 | A | * | 12/1975 | Zlotin et al. | 73/660 |
| 4,060,329 | A | * | 11/1977 | Ellis | 356/614 |
| 4,422,333 | A | * | 12/1983 | Leon | 73/660 |
| 4,518,917 | A | * | 5/1985 | Oates et al. | 324/207.25 |
| 4,573,358 | A | | 3/1986 | Luongo | 73/660 |
| 4,887,468 | A | * | 12/1989 | McKendree et al. | 73/660 |
| 4,896,537 | A | * | 1/1990 | Osborne | 73/660 |
| 5,097,711 | A | * | 3/1992 | Rozelle et al. | 73/660 |
| 5,206,816 | A | * | 4/1993 | Hill et al. | 702/56 |
| 5,511,426 | A | * | 4/1996 | Clement et al. | 73/655 |
| 6,094,989 | A | * | 8/2000 | Twerdochlib | 73/659 |

* cited by examiner

*Primary Examiner*—Hezron Williams
*Assistant Examiner*—Jacques Saint-Surin
(74) *Attorney, Agent, or Firm*—Oblon, Spivak, McClelland, Maier & Neustadt, P.C.

(57) ABSTRACT

Stationary sensors are used to measure periodically the vibratory motions of portions of a body spinning in front of them, such as blades, and to try to determine their natural frequencies by spectral analyses. The sensors are collected together in several networks of different numbers and the determination includes a comparison of the spectra of the different networks via different operations of selection and rejection of lines. The process appreciably pushes back the limit of unambiguous frequency detection.

5 Claims, 3 Drawing Sheets

METHOD FOR CONTACTLESS MEASURING OF VIBRATIONS OF A ROTATING BODY

BACKGROUND OF THE INVENTION

1. Field of the Invention

The subject of the invention is the measurement of the asynchronous vibrations of spinning bodies such as turbine blades by means of sensors placed on the surrounding casing or another fixed position. These measurements are made by sampling, since the sensors can carry them out only when the spinning bodies pass in front of them and are thus called non-intrusive since they are carried out at a distance, without material contact with their object. The sensors used maybe optical, inductive or capacitative. Using stationary sensors is easier than bonding strain gauges onto spinning bodies to measure their distortion directly, which would involve using complex and expensive spinning transmission means or telemetry. Stationary sensors are also able to provide better data than equivalent spinning means, which are subject to difficult and therefore noisy conditions.

2. Discussion of the Background

Using stationary sensors has however the disadvantage of allowing the amplitude of the vibrations to be measured only when the vibrating body moves past, which truncates the measurements of natural frequencies. Indeed a periodic vibratory phenomenon has to be measured at least twice by its highest period to be evaluated without ambiguity, which limits correct measurements to an oscillation frequency band; higher frequency oscillations are measured only with aliasing which makes supernumerary frequencies, with no physical reality, appear in the measurement results.

We are therefore induced to seek a broadening of the band of frequencies that can be detected without ambiguity, in order to reduce the number of natural frequency components located above and subject to aliasing. This can be achieved by reducing the lengths of time between measurements, either by accelerating the rotation of the spinning body, or by increasing the number of sensors assigned to measurement and located over a same circumference so that the vibrating body passes successively in front of them. The first solution is not always practicable and the second has limitations due to the number of sensors to be installed. This is why an improvement of the principle of non-intrusive measurements of vibrations of spinning bodies is hereby proposed to make it easy to distinguish the real vibration frequencies of spinning bodies from the fictitious frequencies, obtained by aliasing natural frequency components above a limit of unambiguous detection, and to remove these fictitious frequencies from the results. The advantage of the improvement is to reduce the number of sensors.

SUMMARY OF THE INVENTION

In the improvement proposed as the invention, the detectors are placed in several networks having different numbers of detectors, a spectrum of measured frequencies is obtained for each of the networks, and comparisons of the spectra of the networks are made in order to select spectral lines and to consider as sought vibration frequencies the frequencies of the selected lines. This combination of a new arrangement of the detectors and of an appropriate processing of their results makes it possible to push back appreciably the upper limit of the unambiguous frequency detection band without requiring any very substantial increase in the number of sensors.

Results processing may comprise several phases according to the actual situation to be addressed.

BRIEF DESCRIPTION OF THE FIGURES

These main aspects of the invention, and others, will be clarified by means of the following detailed description.

DESCRIPTION OF THE PREFERRED EMBODIMENTS

Figure 1:
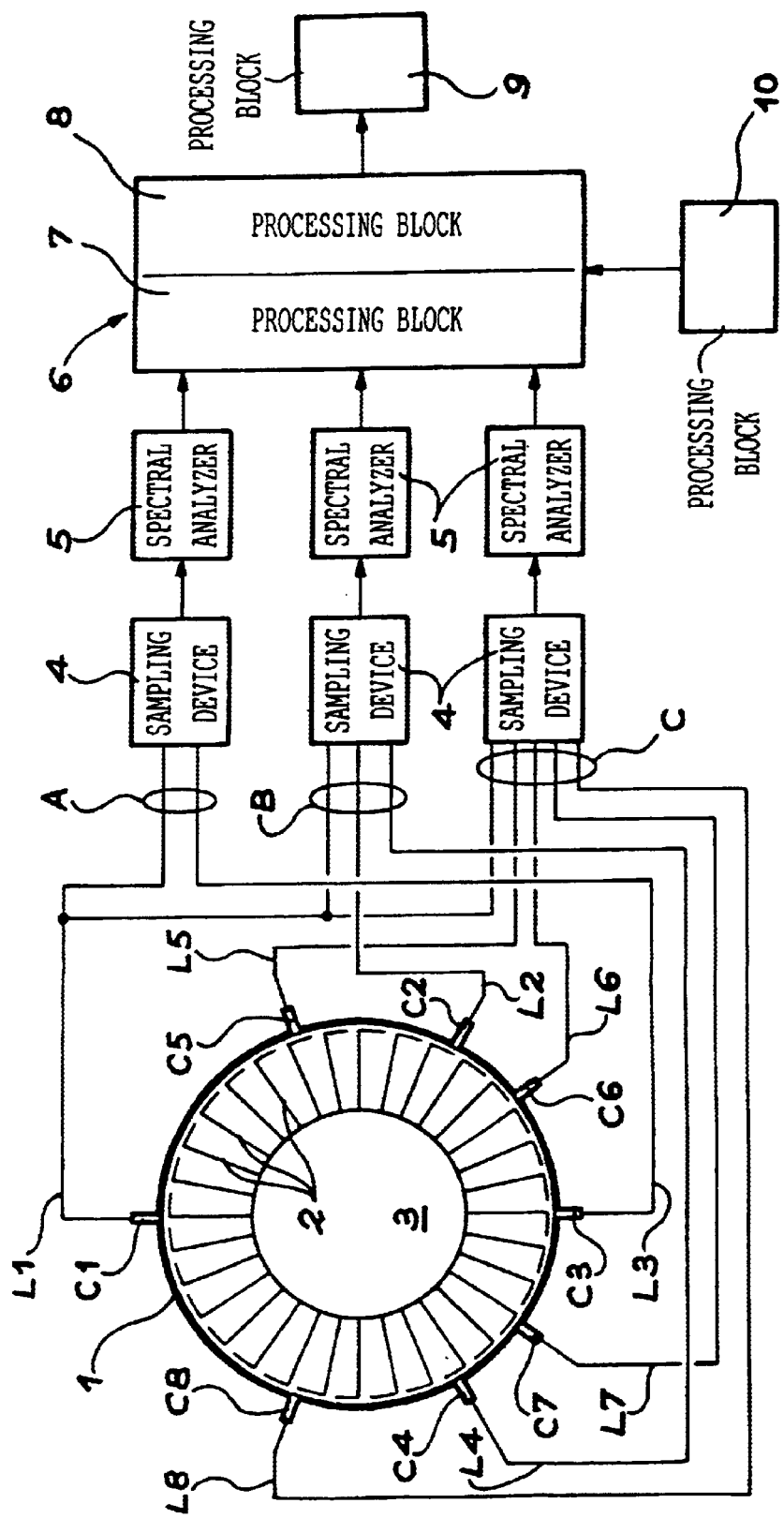
FIG. 1 shows a material embodiment of the invention.

FIG. 1 shows a circular housing seen in transverse cross-section and on which have been bonded eight sensors, denoted C1 to C8, which record the vibrations of blades 2 mounted on a rotor 3 in rotation in the housing 1. The sensors C1 to C8 are distributed in three networks A, B and C, one including the diametrically opposite sensors C1 and C3, another the sensors C1, C2 and C4 each spaced 120° apart and the third the sensors C1, C5, C6, C7 and C8 each spaced 72° apart.

In a general way, the sensors of the networks of the invention are in mutually prime numbers but the networks include to advantage a common sensor; the number of networks is unspecified and the higher it is the better the results it gives. It can indeed be shown that, if the upper limit $F_x$ of the unambiguous frequency detection band of the blades 2 is equal to (Fr.N)/2 when there is only one network of sensors, where Fr is the frequency of rotation of the rotor 3 and N the total number of sensors of the network, it is here equal, if the numbers of sensors are mutually prime, to Fr. $(\Pi Ni)/2$, where $\Pi$ designates the product operation and Ni the number of sensors of each of the networks A, B and C. In the present case, $F_x=15Fr$, instead of 4Fr if the eight sensors C1 to C8 had belonged to a single network; if 10 sensors had been used between three networks of three, four and five sensors, we would have had Fx=30Fr, instead of 5Fr with ten sensors belonging to a common network. The increase in the unambiguous frequency band is therefore rapid as a function of the number of sensors and networks.

Returning to FIG. 1, it can be seen that output lines L1 to L8 of the sensors C1 to C8 are gathered together for each of the networks A, B and C in bundles leading to sampling devices 4 which evaluate, according to the speed of rotation Fr of the rotor 3, the moments when each of the sensors C1 to C8 measures the vibrations produced by a same blade 2. Spectral analysers 5 can then produce, for each of the blades 2 and each of the sensor networks, a spectrum of frequencies evaluated by using a Fourier transformation or an equivalent process. A processing device 6 is lastly used to distinguish the vibratory frequencies of the blades 2 by studying the spectra of the networks A, B and C. It forms an important element of the invention and will therefore be described in detail.

It includes four different processing blocks 7,8,9 and 10, which carry out certain comparison operations on the spectra. These will be clarified firstly by means of FIG. 2, where it is presupposed that the natural frequencies of a blade 2 are 1.10 Hz, 1.55 Hz, 3.78 Hz, 4.63 Hz and 9.15 Hz and have the same amplitude. The upper track in FIG. 3 is the spectrum So which is to be obtained (in the absence of aliasing of frequencies), and the following tracks are the spectra S2, S3 and S5 which are obtained with the three networks of A, B and C of 2, 3 and 5 sensors.

The first block 7 carries out the intersection of the spectra S2, S3 and S5, in other words it shows the lines which are common to them. It is a matter here only of the five lines of natural frequencies, such that the first block 7 can often suffice to perform the required processing on its own; but some cases demanded more complex processing.

In general, the spectra comprise lines of aliasing at frequencies $f=\pm f_a+k.N.Fr$ (formula 1), where $f_a$ is the natural frequency to be found, k is a positive or negative integer, N the number of sensors in the network and Fr is as previously the frequency of rotation of the rotor 3. The second block 8 counts the number of lines obtained in the intersection spectrum in the band limited by the frequency [ppcm (Ni)]Fr/2 (formula 2) where ppcm (Ni) is the smallest common multiple of the numbers of sensors in the networks A, B and C, in other words here (2×3×5)/2=15 Hz if Fr=1 Hz. If this number of lines common to all the spectra is different from the number of lines present in the unambiguous detection band of at least one of the networks A, B and C, limited by the frequency $F_x$ calculated as has been seen and equal here to 1 Hz, 1.5 Hz and 2.5 Hz respectively, the second block 8 calculates the sub-sets of frequencies of the intersection spectrum which are able to explain by themselves the existence of the lines in all the evaluation spectra; the other frequencies of the intersection spectrum determined by the first block 7 can be taken as unwanted and removed.

Figure 3:
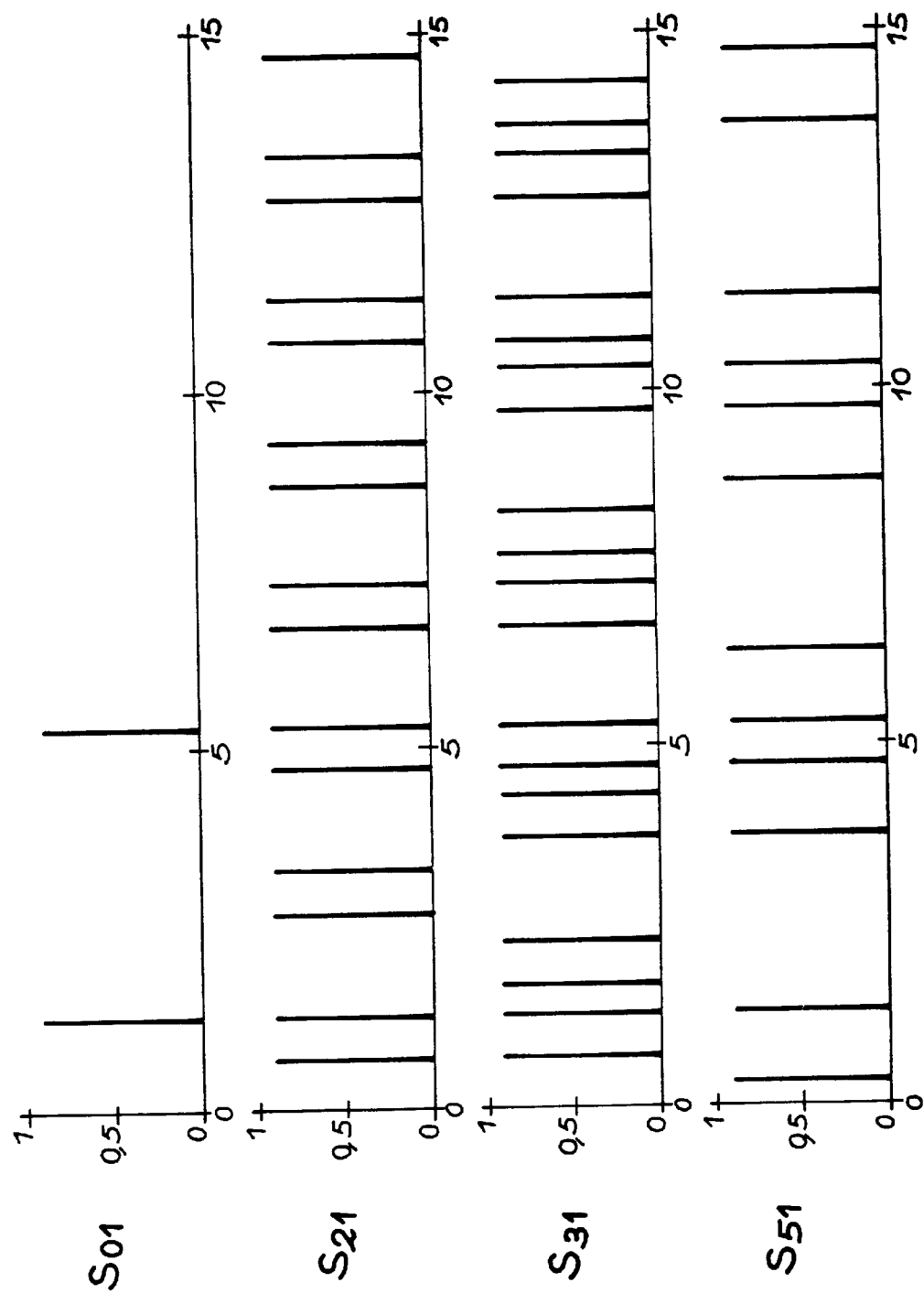

An example appears in FIG. 3, where the spectra S01, S21, S31 and S51 have the same notifications as the spectra S0, S2, S3 and S5 preceding but where the natural frequencies to be detected are here 1.3 and 5.3 Hz. The intersection of the spectra S21, S31 and S51 is then composed of frequencies at 1.3 Hz, 4.7 Hz, 5.3 Hz and 11.3 Hz whereas the spectrum S21 includes only one line (at 0.7 Hz) in the unambiguous detection zone. The second block 8 then calculates, for each of these four frequencies of the intersection spectrum, the frequencies which should appear in the spectra S21, S31 and S51 by applying formula 1 above, then determines which intersection frequencies explain the appearance of all the lines of the spectra S21, S31 and S51 really obtained. Here it is found that the two pairs of frequencies at 1.3 Hz and 5.3 Hz, and 4.7 Hz and 11.3 Hz meet this requirement on their own. One datum coming from another source is then enough to certify one of these frequencies or to remove it and to choose the right group of vibratory frequencies.

Figure 2:
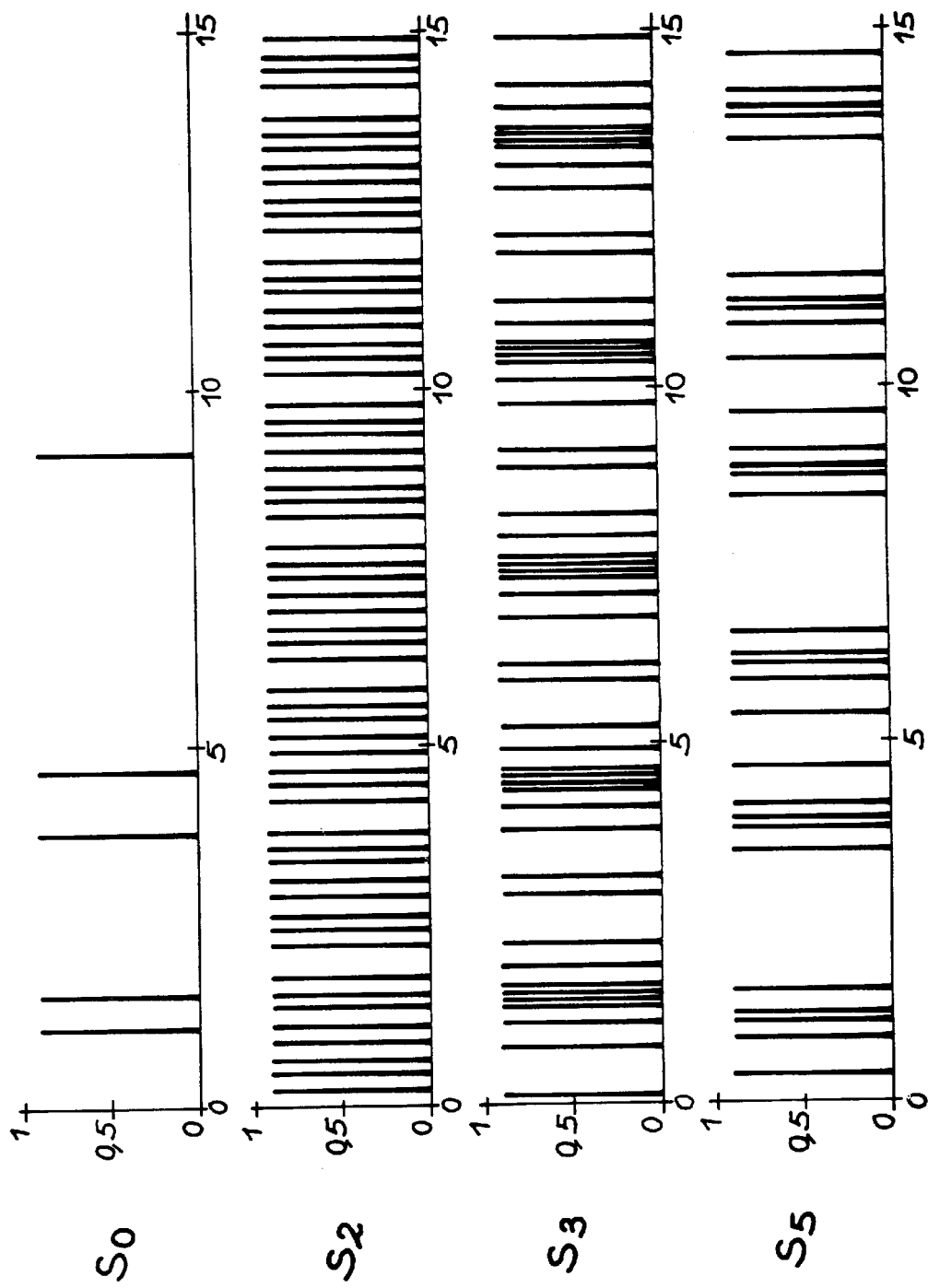
FIGS. 2 and 3 are groups of frequency spectra used to determine the natural frequencies of a vibrating system.

In the case in FIG. 2, where each of the spectra S2, S3 and S5 counts five lines in the unambiguous detection band, as many as of lines in the band limited by formula (2) in the intersection spectrum S0, the second block 8 does not have to do the work explained above.

The two other blocks 9 and 10 can be used for tests at variable rotation speed of the rotor 3. The third block 9 is used to distinguish, for each network of sensors A, B and C, the lines whose frequency variation is incompatible with those of the engine speed and eliminates them; the other lines are real vibratory frequencies of the blades 2, since they correspond to the case K=0 in formula 1. The third block 9 therefore removes these lines associated with too rapidly variable frequencies after several spectra have been taken for changing rotation speeds.

The fourth block is useful for certain situations when natural frequencies have an offset such that it corresponds to certain multiples of the frequency of rotation Fr which then cause additional lines common to all the evaluation spectra to appear suddenly; but as these common lines disappear as soon as the frequency of rotation changes, they are easy to detect, and the fourth block 10 is responsible for identifying them by verifying whether successive spectra have the same number of lines, and by removing the supernumerary lines which do not have a counterpart on other spectra of the same network.

The process therefore involves, in its best embodiment, the prior use of the first block 7, which gives the intersection frequencies of the evaluation spectra; then the second block 8 determines if all the intersection frequencies really are natural frequencies by applying the criterion given above, and in the negative, it determines the possible solutions; if the test is at variable speed rotation, the third block 9 is used on its own or after the first block 7 and the fourth block 10 after the first block 7.

What is claimed is:

1. A process for measuring vibration frequencies of portions of a spinning body by using detectors placed around the spinning body and in front of which the portions pass, by converting measurements of the detectors into frequency spectra, wherein the detectors are distributed in several networks having different, particularly mutually prime, numbers of detectors, a spectrum is obtained for each of the networks and in that comparisons of the spectra of the networks are made in order to select lines of the spectra and to consider as the vibration frequencies the frequencies of the lines selected, including a selection of the lines which are common to all the spectra, and including a comparison between a number of the lines which are common to all the spectra up to a frequency equal to Fr/2, where Fr is a frequency of rotation of the spinning body and ppcm (Ni) is a smallest common multiple of numbers Ni of the sensors of all the networks, and the numbers of lines present in each of the networks up to a frequency respectively equal to Ni·Fr/2.

2. A process for measuring vibration frequencies according to claim 1, including, if the number of said lines which are common to all the spectra up to the frequency equal to Fr/2 does not coincide with the number of lines of at least one of the networks up to the frequency respectively equal to Ni·Fr/2, a search for groups of said common frequencies, which allow appearance of the lines present in each of the spectra to be explained.

3. A process for measuring vibration frequencies according to claim 1, including a variation of frequency of rotation of the spinning body and a selection of the lines by removing lines of frequency incompatibly variable with the variations in rotation speed of the spinning body.

4. A process for measuring vibration frequencies according to claim 1, including a variation in frequency of rotation of the spinning body and an elimination of lines which appear only at a particular rotation frequency of the spinning body.

5. A process for measuring vibration frequencies according to claim 1, wherein the networks of detectors have a common detector.

* * * * *